United States Patent
Francini et al.

(10) Patent No.: US 11,252,971 B2
(45) Date of Patent: Feb. 22, 2022

(54) ANTIMICROBIAL PACKAGING FILMS

(71) Applicant: Cryovac, LLC, Charlotte, NC (US)

(72) Inventors: Giorgia Francini, Arese (IT); Valeria Vigano, Buguggiate (IT); Roberto Forloni, Rho (IT)

(73) Assignee: Cryovac, LLC, Charlotte, NC (US)

( * ) Notice: Subject to any disclaimer, the term of this patent is extended or adjusted under 35 U.S.C. 154(b) by 68 days.

(21) Appl. No.: 16/631,319

(22) PCT Filed: Jul. 12, 2018

(86) PCT No.: PCT/EP2018/069045
§ 371 (c)(1),
(2) Date: Jan. 15, 2020

(87) PCT Pub. No.: WO2019/016086
PCT Pub. Date: Jan. 24, 2019

(65) Prior Publication Data
US 2020/0231773 A1    Jul. 23, 2020

(30) Foreign Application Priority Data
Jul. 19, 2017   (EP) .................................... 17182202

(51) Int. Cl.
| | | |
|---|---|---|
| *A23B 4/14* | (2006.01) |
| *B05D 1/00* | (2006.01) |
| *C08J 7/052* | (2020.01) |
| *B05D 3/14* | (2006.01) |
| *B05D 7/04* | (2006.01) |
| *C08J 7/06* | (2006.01) |

(52) U.S. Cl.
CPC .................. *A23B 4/14* (2013.01); *B05D 1/60* (2013.01); *B05D 3/144* (2013.01); *B05D 7/04* (2013.01); *C08J 7/052* (2020.01); *C08J 7/065* (2013.01); *B05D 2201/02* (2013.01); *B05D 2320/00* (2013.01); *B05D 2401/21* (2013.01)

(58) Field of Classification Search
None
See application file for complete search history.

(56) References Cited

U.S. PATENT DOCUMENTS

| | | |
|---|---|---|
| 4,120,716 A | 10/1978 | Bonet |
| 4,589,247 A | 5/1986 | Tsuruta et al. |
| 5,380,530 A | 1/1995 | Hill |
| 7,288,274 B2 | 10/2007 | Hilgren et al. |
| 7,662,417 B2 | 2/2010 | Bonaventura et al. |
| 8,343,522 B2 | 1/2013 | Pohl et al. |
| 8,445,419 B2 | 5/2013 | Gutzman et al. |
| 8,808,724 B2 | 8/2014 | Cichocki et al. |
| 8,926,997 B1 | 1/2015 | Stockel |
| 9,241,497 B2 | 1/2016 | Luchansky et al. |
| 9,271,495 B2 | 3/2016 | Sawyer et al. |
| 9,296,504 B2 | 3/2016 | Blattner et al. |
| 2006/0177548 A1 | 8/2006 | Sekula et al. |
| 2006/0263329 A1* | 11/2006 | Eemeta .................... A61L 31/06 424/78.37 |
| 2007/0178811 A1 | 8/2007 | Sundaram |
| 2009/0023790 A1 | 1/2009 | Levy et al. |
| 2009/0297568 A1* | 12/2009 | Grah ........................ C08K 9/04 424/401 |
| 2010/0284985 A1 | 11/2010 | Mygind et al. |
| 2011/0079531 A1 | 4/2011 | Kreuzlingen |
| 2012/0087968 A1 | 4/2012 | Ebner |
| 2013/0231389 A1 | 9/2013 | Sawyer et al. |
| 2015/0342197 A1 | 12/2015 | King et al. |
| 2016/0288411 A1* | 10/2016 | Lamie ....................... B32B 3/10 |

FOREIGN PATENT DOCUMENTS

| | | |
|---|---|---|
| EP | 1084628 B1 | 8/2004 |
| EP | 1912507 B1 | 8/2014 |
| JP | 2011162517 A | 8/2011 |
| NZ | 583501 A | 7/2011 |
| WO | 2001049121 A1 | 7/2001 |
| WO | 2016060562 A1 | 4/2016 |
| WO | 2016140780 A1 | 9/2016 |
| WO | 2016140781 A1 | 9/2016 |
| WO | 2016182831 A1 | 11/2016 |
| WO | 2017027560 A1 | 2/2017 |

OTHER PUBLICATIONS

Pornpun Theinsathid, et al: "Antimocrobial Activity of Lauric Arginate-Coated Polyactic Acid Films against Listeria monocytogenes and *Salmonella typhimurium* on Cooked Slice Ham", Journal of Food Science, vol. 77, No. 2, Feb. 28, 2012 (Feb. 28, 2012), pp. M142-M149, XP055431347.

Mingming Guo, at al: "Antimicrobial films and coatings for inactivation of Listeria innocua on ready-to-eat deli turkey meat", Food Control, Butterworth, London, GB, vol. 40, Jun. 1, 2014 (Jun. 4, 20414), pp. 64-70, XP002733665.

(Continued)

*Primary Examiner* — Shamim Ahmed
*Assistant Examiner* — Bradford M Gates
(74) *Attorney, Agent, or Firm* — Jason R. Womer

(57) ABSTRACT

The present invention is directed to a thermoplastic packaging film coated with an antimicrobial coating, a method for the preparation of the coated film and packaging articles made with the film.

20 Claims, No Drawings

(56) References Cited

OTHER PUBLICATIONS

Muriel-Galet V et al: "Antimicrobial effectiveness of Lauroyl Arginate Incorporated into Ethylene Vinyl Alcohol Copolymers to extend the shelf-life of chicken stock and surimi sticks", Food and Bioprocess Technology an International Journal, Springer-Verlag, New York, vol. 8, No. 1, Sep. 5, 2014 (Sep. 5, 2014), pp. 208-217, XP0354208949.

Veronica Otero et al: "Evaluation of two antimicrobial packaging films against *Escherichia coli* 0157:H7 strains in vitro and during storage of a Spanish ripened sheep cheese (Zamorano)", Food Control., vol. 42, Feb. 22, 2014 (Feb. 22, 2014) pp. 296-302, XP055431348.

\* cited by examiner

ANTIMICROBIAL PACKAGING FILMS

TECHNICAL FIELD

Background Art

Microbial contamination of food reduces the shelf life and nutritive value of foods and increases the risk of foodborne illnesses. Food contamination can occur upon its exposure to the environment during processing, preparation or packaging. Several methods to extend the shelf life of food products have traditionally been employed for preserving food from microbial contamination, such as thermal processing, drying, freezing, refrigerating, irradiating with sterilizing radiations and salting. However, many of these may result in undesirable changes to the characteristics of the food products and are not applicable to all types of foods; in particular, they are not suitable for fresh and minimally processed foods, such as fresh meat.

Recently, attention has been focused on the implementation of antimicrobial packaging systems.

One approach has been to incorporate antimicrobial agents, by spraying or dipping, directly into foods, before packaging in traditional packaging material. However, it has been demonstrated that the direct application of antibacterial substances to foods brings limited benefits since the antibacterial substances may be neutralized by components of the food and, upon application, they are not retained at the surface of the food, where contamination primarily occurs, but diffuse rapidly inside its mass.

An alternative approach has been to develop packaging materials able to prevent microbial contamination of packaged food products. Different strategies have been devised in order to prepare packaging materials that contain antimicrobial active molecules into their structure. The design of these materials is quite complex since it requires obtaining structures with stable properties upon time and able to slowly release a sufficient amount of antimicrobial agent for an extended period.

According to one method, antimicrobial agents are added to the blends used for extrusion of the packaging film. However, this method has a number of disadvantages. Firstly, the antimicrobial agent is exposed to high temperatures during extrusion and may undergo degradation. Furthermore, it is not cost effective since the antimicrobial material is partially immobilized within the film matrix and not completely available at the surface of the film for exerting its activity on the packaged food and therefore a high amount of active compound is necessary. Finally, the presence of the antimicrobial may have an impact on the properties of the film.

An alternative method is to apply the antimicrobial additive as a coating, particularly on the food-contact surface of the packaging film. One of the big challenges encountered when using this method is obtaining a sufficient binding or adhering capacity of the coating on the base films combined with an effective release of the active additive. The antimicrobial coating should control the release of the active antimicrobial additive and be sufficiently stable to maintain effective antibacterial properties of the film over time. To this aim, antimicrobial coating compositions comprising film-forming polymers as carriers are used in order to form a continuous, cohesive and adhesive matrix on the surface of the film. Usually the polymers are edible, hydrosoluble polymers such as, for example, edible cellulose polymers. However, in many of the antimicrobial coated films of the prior art, the antimicrobial coating has still the tendency to be lost or abraded from the surface of the film or an undesirable rate of release of the antimicrobial is obtained, with consequent poor antimicrobial performance. Lauric Arginate Ethyl Ester (LAE), hereinafter also referred to as LAE, is a derivative of lauric acid having a wide range antimicrobial activity derived from its surfactant chemical structure. LAE has been verified to be nontoxic and is "Generally Recognized As Safe" (GRAS) by the U.S. Food and Drug Administration. It is hydrolyzed in the human body into arginine and lauric acid, which are common substances produced by metabolism of several foods.

Use of LAE as antimicrobial in edible polymeric film coatings on packaging films such as polylactic acid films has been described.

For example, in a study, a compositions containing LAE and chitosan, an edible polymer well known for its film-forming properties and antimicrobial activity, was used to coat polylactic acid (PLA) packaging films. The obtained films were shown to be effective against *Listeria innocua* inoculated onto the surface of RTE meat samples (Guo, M., et al, Food Control 40 (2014), pages 64-70). The above study showed that adherence of the coating to the film was problematical and was significantly affected by pretreatment conditions of films, concentration of chitosan, and other additives in the coating solutions. Therefore, films coated with the above composition do not show sufficient stability and reproducibility to make them suitable for commercial use.

WO 2016/140780 and WO 2016/140781, both in the name of Dow Global Technologies LLC, describe a packaging material wherein an antimicrobial composition comprising an active antimicrobial agent (e.g. LAE) and a carrier is applied to the surface of a substrate (e.g. a polymeric film). The carrier comprises polymers such as cellulose ether polymers, gelatin, pectin, xantan gum, guar gum, that result in the antimicrobial composition (i) having a viscosity of at least 50 centipoise at temperatures between 2° C. and 12° C. and/or (ii) being in the form of a hydrogel.

Another study (Pornpun Theinsathid et al, Journal of Food Science, Vol. 77, no. 2, 2012, pages M142-M149) discloses an antibacterial packaging wherein a PLA film is surface-activated by corona treatment and subsequently coated by spraying upon it a solution of LAE (namely, Protect-M) diluted in distilled water. Protect-M is a solution of LAE in polymeric carriers, namely propylene glycol and polysorbate 20. The resulting antibacterial packaging was shown to be effective against *L. Monocytogenes* and *S. Typhimurium* up to 7 days. In view of the above, it is strongly felt the need of developing antibacterial packaging films, in particular that are cost effective, reproducible, stable and able to protect food from microbial contamination over a prolonged period of time.

SUMMARY OF THE INVENTION

The present inventors have now surprisingly found that, contrary to the consolidated opinion in the prior art, lauric arginate ethyl ester (LAE) can be applied on the surface of thermoplastic films to form an effective and stable antimicrobial coating without the need of a polymeric carrier. As will be shown in the experimental section, the coating obtained is reproducible, stable and durable and exerts an effective antimicrobial activity which is retained for long periods of time.

Accordingly, a first object of the present invention is a thermoplastic film having one or both surfaces coated with a coating containing lauric arginate ethyl ester, wherein said coating does not contain any polymer.

A second object of the present invention is a method for the preparation of the coated film according to the first object of the invention.

A third object of the invention is a solution or a dispersion of lauric arginate ethyl ester in a liquid vehicle containing a mixture of water, ethanol, isopropyl alcohol and ethyl acetate, wherein said solution or dispersion does not contain any polymer.

A fourth object of the present invention is an article for packaging made from the film of the first object of the invention.

A fifth object of the present invention is the use of the film according to the first object of the invention for packaging products, preferably food products.

Definitions

As used herein the term "lauric arginate ethyl ester" refers to a product obtained by esterifying arginine with ethanol, followed by reacting the resulting ester with lauroyl chloride. The product obtained is composed of lauric acid, L-arginine HCl and ethanol moieties. Without wishing to be bound by any specific theory, it is believed that the active portion of lauric arginate ethyl ester is its cationic moiety, i.e. ethyl-$N^\alpha$-dodecanoyl-L-arginate; in fact, cationic surfactants are known to disrupt the integrity of cell membranes in a broad spectrum of bacteria, yeasts and molds. The lauric arginate ethyl ester is generally available as a hydrochloride salt (ethyl-$N^\alpha$-dodecanoyl-L-arginate.HCl, CAS number 60372-77-2), having molecular weight of 421.02. Usually, lauric arginate ethyl ester contains the active ethyl-$N^\alpha$-dodecanoyl-L-arginate in amounts between 85 and 95%. Synonyms for lauric arginate ethyl ester are ethyl lauroyl arginate, lauric arginate ester, lauramide arginine ethyl ester and LAE. LAE is commercially available for example from Vedeqsa, Inc., New York, US or from A&B Ingredients, Fairfield, N.J., US.

As used herein the term "antimicrobial" refers to the ability to kill microorganisms or to stop their growth. Thus, an antimicrobial agent or composition is an agent or a composition which kills microorganisms or prevents them from growing. "Antimicrobial activity" means the capability of an agent or a composition to reduce the microorganisms population (by killing microorganisms or stopping their growth), in respect to a control. In the context of the present invention, "antimicrobial" and "antibacterial" are intended to be synonymous and are used interchangeably.

As used herein, "microorganism" refers to any organism capable of contaminating a product, in particular a food product such as meat, fish, cheese, thereby making such products unsuitable or unhealthy for human or animal consumption or contact. In general, microorganisms include bacteria, fungi, yeasts, algae, molds, mycoplasmids, protozoa, viruses and the like.

As used herein the term "coating" refers to a thin, continuous or discontinuous layer of a material applied to a substrate, such as a film; the coating material can be in liquid, solid or vapor form at the moment of deposition onto the substrate; by 'discontinous', it is meant that the layer of coating material forms a discontinuous, regular or irregular, pattern onto the substrate; by "thin" a thickness of the layer from 0.1 to 50 microns is meant.

Several coating (or deposition) techniques can be used to apply the coating onto the substrate, for example digital printing, roller printing, flexography, ink-jet printing, slot die, rotogravure, vapour deposition, or by blade, brush or scraper, spraying or pouring, as described, for example, in EP2285558 in the name of Amcor.

The term "polymer" as used herein, refers to a molecule formed by repeating units and obtained by a polymerization reaction. The term is inclusive of homopolymers, copolymers, terpolymers and the like.

The term "polyolefin" as used herein refers to any polymerized olefin, which can be linear, branched, cyclic, aliphatic, aromatic, substituted, or unsubstituted, including "modified polyolefin". More specifically, included in the term polyolefin are homo-polymers of olefin, co-polymers of olefin, co-polymers of an olefin and a non-olefin co-monomer co-polymerizable with the olefin, such as vinyl monomers, modified polymers thereof, and the like. The term "modified polyolefin" is inclusive of modified polymer prepared by co-polymerizing the homo-polymer of the olefin or co-polymer thereof with an unsaturated carboxylic acid, e.g., maleic acid, fumaric acid or the like, or a derivative thereof such as the anhydride, ester or metal salt or the like. It is also inclusive of modified polymers obtained by incorporating into the olefin homo-polymer or co-polymer, by blending or preferably by grafting, an unsaturated carboxylic acid, e.g., maleic acid, fumaric acid or the like, or a derivative thereof such as the anhydride, ester or metal salt or the like.

Specific examples of polyolefins include polyethylene homo-polymer, polypropylene homo-polymer, polybutene homo-polymer, ethylene-α-olefin co-polymer, propylene-α-olefin co-polymer, butene-α-olefin co-polymer, ethylene-unsaturated ester co-polymer, ethylene-unsaturated acid co-polymer, (e.g. ethylene-ethyl acrylate co-polymer, ethylene-butyl acrylate co-polymer).

The term "polyethylene" as used herein, refers to homopolymers or heteropolymers consisting essentially of ethylene repeating units. The term includes heterogeneous polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, medium density polyethylene (MDPE) with a density usually in the range of from about 0.926 g/cc to about 0.940 g/cc and very low and ultra low density polyethylene (VLDPE and ULDPE) with a density lower than about 0.915 g/cc, typically in the range 0.868 g/cc to 0.915 g/cc. All these latter materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures.

The term "polyester" is used herein to refer to both homo- and co-polyesters, wherein homo-polyesters are defined as polymers obtained from the condensation of one dicarboxylic acid with one diol or of only one hydroxycarboxylic acid or lactone and wherein co-polyesters are defined as polymers obtained from the condensation of at least one dicarboxylic acids with at least two diols or at least two dicarboxylic acids with at least one diol or from the condensation of at least two hydroxyacids or lactones.

The term "polyamide" is used herein to refer to high molecular weight polymers having amide linkages along the molecular chain, and refers more specifically to synthetic polyamides such as nylons. Such term encompasses both homo-polyamides and co-, ter- or multi-polyamides. It also specifically includes aliphatic polyamides or co-polyamides, aromatic polyamides or co-polyamides, and partially aromatic polyamides or co-polyamides, and blends thereof. The homo-polyamides are derived from the polymerization of a single type of monomer comprising both the chemical functions which are typical of polyamides, i.e. amino and acid groups, such monomers being typically lactams or aminoacids, or from the polycondensation of two types of monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof.

As used herein the expression "a polyolefin, a polyester, a polyolefin/polyester or a polyamide based layer" refers to a layer substantially made of one or more polyolefin, polyester, a mixture of polyolefin and polyester or polyamide, respectively, as previously defined.

As used herein the expression "a layer substantially made of polyolefin, polyester, polyolefin/polyester or polyamide" refer to a layer made of at least 80%, 90%, 95%, 98% or more, up to and including 100% of one or more polyolefin, polyester, polyolefin/polyester or polyamide.

As used herein, the expression "corona treatment" or "corona treating" refers to a process whereby the outer surface(s) of a film are subjected to a corona discharge treatment, i.e., the ionization of a gas such as air in close proximity to a film surface, said ionization being initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein the expression "plasma treatment" or "plasma treating" refers to a process whereby the outer surface(s) of a film are subjected to a plasma discharge treatment. This treatment, which can be done either in vacuum or in atmosphere, consists in applying an electrical discharge to a gas, thus ionizing it: the ionized gas thus formed can interact with the substrate. Typically, an effect of plasma treatment is the significant increase of the substrate surface tension, making it more suitable to further processes involving adhesion. According to the nature of the gas used, to the power applied and to the gas pressure, the effect of plasma treatment on the substrate can be specifically tuned.

As used herein the expression "heat-shrinkable film" refers to the tendency of a solid state oriented film to shrink upon the application of heat, i.e. to contract upon heating, such that the size of the film decreases when the film is in an unrestrained state. As used herein, said term refers to solid-state oriented films with a free shrink of at least 10% in at least one of the machine and the transverse directions, as measured by standard ASTM D 2732 in water at 90° C.

As used herein, the expressions "machine direction" (MD) and "longitudinal direction" (LD) refer to the direction "along the length" of the film, i.e., the direction of the film as the film is formed during extrusion and/or coating. As used herein, the phrase "transverse direction" (TD) refers to the direction "across the film", perpendicular to the machine direction.

As used herein, the term "support" when used in the context of packaging articles, refers to any object suitable for supporting and possibly containing a product. The support may be flat or hollow. A hollow support is herein named container. The support may be rigid, semi-rigid or flexible. Suitable examples of supports are, for instance, a tray, a bowl, a dish, a box, a flat support, that are optionally provided with a sealing area, suitable for being sealed to the sealant layer of the film of the present invention.

As used herein the term "flexible container" refers to a container obtainable by self-sealing a single piece of film in the form of an envelope, a bag or a pouch or by heat sealing two identical or different films, named top and bottom. Bags or pouches include, for example: lay-flat, end-seal bags made from a seamless tubing and having an open top, first and second folded side edges, and an end seal across a bottom of the bag; lay-flat side seal bags made from a seamless tubing and having an open top, a folded bottom edge and first and second side seals; lay flat, V-shaped side seal bags made from a seamless tubing and having an open top, a folded bottom edge and first and second side seals, which may be completely angled with respect to the open top, thus providing a triangular bag or partially straight (i.e. perpendicular to the open top) and partially angled, thus providing a trapezium-like shape; lay flat pouches made by heat sealing two flat films to one another, the pouch having an open top, a first side seal, a second side seal and a bottom seal.

As used herein, the term "lid" refers to a cover for closing the opening of a rigid container and/or enclosing a product contained in or supported on a container.

DETAILED DESCRIPTION OF INVENTION

A first object of the present invention is a thermoplastic packaging film having at least one surface coated with a coating containing lauric arginate ethyl ester, wherein said coating does not contain any polymer.

Preferably, said coating comprises at least 40 wt % of lauric arginate ethyl ester. More preferably said coating comprises at least 40 wt %, 50 wt %, 60 wt %, 70 wt %, 80 wt %, 90 wt %, 95 wt %, 96% wt %, 97 wt %, 98 wt %, 99 wt % or 100 wt % of lauric arginate ethyl ester.

According to a preferred embodiment, said coating consists of lauric arginate ethyl ester and, optionally, small amounts, preferably equal to or lower than 5 wt %, 4 wt %, 3 wt %, 2 wt %, 1 wt %, of water and/or organic solvents as will be defined below. According to this embodiment, the coating preferably contains at least 95 wt %, 96 wt %, 97 wt %, 98 wt %, 99 wt %, 100 wt % of lauric arginate ethyl ester.

The present inventors have found that lauric arginate ethyl ester is able to form a stable and effective antimicrobial coating also in combination with one or more further antimicrobial agents and/or odour absorbers. Therefore, in another preferred embodiment, said coating further contains, in addition to lauric arginate ethyl ester, at least one further antimicrobial agent and/or an odour absorber.

According to this embodiment, the coating preferably contains at least 40 wt %, 50 wt %, 60 wt %, 70 wt % or 80 wt %, more preferably between 50 wt % and 95 wt % of lauric arginate ethyl ester.

Preferably, said further antimicrobial agent is selected from cetylpyridinium chloride, liquid smokes, as for example the products commercialized under the trade names Cloud S5 and Cloud S9 by Kerry Foods, essential oils, such as thyme or rosemary essential oil, and dried vinegar. More preferably the antimicrobial agent is cetylpyridinium chloride. Preferably, said cetylpyridinium chloride is present in the coating in an amount comprised between 3 and 18 wt %, more preferably between 5 and 15 wt %, even more preferably of 8 or 14 wt %.

Preferably, said odour absorber is selected from the group consisting of MgO/MgCo3, Zn and/or Na and/or Mg based powders and resins and zeolite. Preferably, the odour absorber is zeolite, preferably present in the coating in an amount between 10 and 50 wt %, more preferably between 25 and 45 wt %, even more preferably between 30 and 45 wt %, even more preferably of 33 wt % or 42 wt %.

As it will be shown in the experimental section, the present inventors have found that the addition of zeolite to the coating allows obtaining a significant improvement in the preservation of the organoleptic properties of food packaged in the film of the invention over time.

Preferably, lauric arginate ethyl ester is present on the coated surface of the thermoplastic film in an amount of at least 0.2 g/sqm, preferably comprised between 0.2 and 1.5 g/sqm, more preferably between 0.4 and 1 g/sqm, even more preferably between 0.6 and 1.0 g/sqm.

The film of the invention may be a monolayer or a multilayer film. The multilayer film preferably contains a number of layers between 1 and 20, preferably between 2 and 10, more preferably between 4 and 8.

The different layers of the film of the invention may comprise any thermoplastic polymer suitable for use in the manufacture of a packaging film. Polymers or polymer blends suitable to be included in the different layers are well known to the skilled man.

Preferably, the outer layer of the film of the invention whose surface is coated with lauric arginate ethyl ester is a polyolefin, a polyester, a polyolefin/polyester or polyamide based layer.

According to a particularly preferred embodiment, said layer contains at least 80% of polyolefin, preferably a polyethylene selected from linear low density, low density or very low density polyethylene and mixtures thereof. The film according to the invention may have only one or both surfaces coated with said coating.

The film is preferably a sealable film, more preferably a heat sealable film. If the film is a sealable film, the coating is at least on the surface of the sealant layer.

Films having both surfaces coated according to the invention are particularly preferred since they have the advantage that, when used to prepare a package, both the inner and outer surface of the package exert an antimicrobial activity. In particular, the coating on the inner surface of the film protects the packaged food from bacterial contamination during storage while the coating on the outer surface decreases the risk of cross contamination or contamination of the food when the package is opened.

The presence of the lauric arginate ethyl ester coating on the surface of the film of the invention does not interfere with its packaging applications. For example, the films of the invention may be used in thermoforming, tray lidding, bags or pouches, overwrapping or vacuum skin packaging.

According to a preferred embodiment, the film of the invention is a film suitable for tray lidding applications. According to another preferred embodiment, the film of the invention is a film suitable for the preparation of a flexible container, such as a bag or pouch.

According to another preferred embodiment, the film of the invention is a film suitable for thermoforming applications.

According to another preferred embodiment, the film of the invention is a film suitable for vacuum skin packaging applications.

The film of the invention may be or not be oriented. According to a preferred embodiment, it is mono or biaxially oriented, more preferably it is biaxially oriented.

According to a particularly preferred embodiment, the film of the invention is heat-shrinkable. As it will be shown in the experimental section, the present inventors have surprisingly found that packages wherein the film of the invention is shrunk, show an increase in the antimicrobial activity exerted by the LAE coating and allow to obtain longer shelf lives of the packaged food compared to packages with unshrunk films.

The heat shrinkable film of the invention preferably has a percentage of free shrink at 90° C. in water of at least 10%, preferably of at least 15%, more preferably between 10% and 40%, in longitudinal and/or in transverse direction, measured according to ASTM D2732.

A second object of the present invention is a method for the preparation of a coated film according to the first object of the invention wherein a coating composition containing lauric arginate ethyl ester is applied to one or to both the surfaces of a film, wherein said coating composition does not contain any polymer.

Preferably, prior to the application of the coating composition, said method further comprises a step of corona treating or plasma treating the surface(s) of the film to be coated.

In the method according to the second object of the invention, the coating composition may be applied to the film by any suitable conventional technique, well known in the art, such as for example digital printing, roller printing, flexography, ink-jet printing, slot die, rotogravure, vapour deposition, or by blade, brush or scraper, or by spraying or pouring.

According to one preferred embodiment, the coating composition is a solution or a dispersion of lauric arginate ethyl ester in a liquid vehicle.

According to this embodiment, the application of the coating composition is followed by the removal of the liquid vehicle. This is preferably carried out by drying using procedures well known in the art, for example in an oven, preferably an air oven or a IR heated oven. Preferably, drying is carried out at a temperature comprised between 70° and 100° C., thus leaving a solid coating on the surface of the film.

Preferably, said liquid vehicle contains water and one or more water miscible organic solvents. More preferably, said liquid vehicle consists of water and one or more water miscible organic solvents.

Preferably, said water miscible organic solvents are selected from $C_1$-$C_4$ alcohols and $C_1$-$C_4$ esters and mixtures thereof. More preferably, they are selected from ethanol, isopropyl alcohol, ethyl acetate and mixtures thereof. A particularly preferred mixture of solvents consists in a mixture of ethanol, isopropyl alcohol and ethyl acetate. Preferably, in said mixture the weight ratio between ethanol, isopropyl alcohol and ethyl acetate is between 2:1:1.25 and 2.5:1:1.25. As will be demonstrated in the experimental section, the inventors have found that these mixtures of solvents allow obtaining coatings that do not show any sticking effect at the surface of the film.

Preferably, the weight ratio between water and organic solvents in the liquid vehicle is between 1:7 and 1:9.

Preferably, said solution or dispersion comprises between 5 and 30 wt %, more preferably between 5 and 20 wt %, even more preferably 10 wt % of water. More preferably, the solution or dispersion further comprises an amount of water miscible organic solvent between 70 wt % and 90 wt %. More preferably, the solution or dispersion comprises between 30 and 40 wt % of ethanol, between 12 and 20 wt % of isopropyl alcohol and between 15 and 25 wt % of ethyl acetate.

Preferably, said solution or dispersion contains an amount of lauric arginate ethyl ester between 1 and 30 wt %, preferably between 2 and 25 wt %.

Said solution or dispersion may further contain, in addition to lauric arginate ethyl ester, one or more further antimicrobial agents and/or odour absorbers.

Preferably, said further antimicrobial agent is selected from cetylpyridinium chloride and dried vinegar. Preferably, cetylpyridinium chloride is present in the solution or dispersion in an amount comprised between 0.2 and 3 wt %, more preferably between 0.3 and 2 wt %, even more preferably of about 0.3 wt %, 1 wt % or 1.6 wt %. Preferably, said odour absorber is zeolite. Preferably, zeolite is present in the solution or dispersion in an amount between 2 and 15 wt %, more preferably between 3 and 10 wt %, more preferably between 3 and 8 wt %, even more preferably of 5 wt %.

The above described solution or dispersion may be applied to the film by any suitable conventional technique well known in the art, preferably it is applied to the film by Direct Gravure, Reverse Roller Gravure, Offset gravure or Smooth Roll.

According to an alternative preferred embodiment, the coating composition is a powder comprising at least 90 wt %, 95 wt %, 98 wt %, 99 wt %, more preferably 100 wt % lauric arginate ethyl ester.

In this case, application of the coating is preferably carried out by a vapour deposition method. According to this embodiment, the lauric arginate ethyl ester powder is melted by heating, preferably at a temperature between 90 and 100° C., more preferably at 95° C. and then flash evaporated by heating at a higher temperature, preferably between 220 and 250° C., more preferably at 240° C. The evaporated lauric arginate ethyl ester is then sprayed onto the surface or surfaces of the film to be coated which is laid onto a chill roll, for example set at −10° C.

The coating is carried out preferably at a coating speed that varies depending on the type of coating equipment used. Preferably, on industrial equipment the coating is carried out at a speed comprised between 200 and 600 m/min, more preferably between 300 and 600 m/min, more preferably between 400 and 500 m/min.

A third object of the invention is a solution or a dispersion of lauric arginate ethyl ester in a liquid vehicle containing a mixture of water, ethanol, isopropyl alcohol and ethyl acetate, wherein said solution does not contain any polymer. Preferably, in said mixture the weight ratio between ethanol, isopropyl alcohol and ethyl acetate is between 2:1:1.25 and 2.5:1:1.25.

Preferably, the weight ratio between water and the organic solvents in the liquid vehicle is between 1:7 and 1:9. Preferably, said solution or dispersion comprises between 5 and 30 wt %, more preferably between 5 and 20 wt %, even more preferably 10 wt % of water. More preferably, the solution or dispersion further comprises an amount of the above described mixture of organic solvents between 70 wt % and 90 wt %. More preferably, the solution or dispersion comprises between 30 and 40 wt % of ethanol, between 12 and 20 wt % of isopropyl alcohol and between 15 and 25 wt % of ethyl acetate.

Preferably, said solution or dispersion contains an amount of lauric arginate ethyl ester between 1 and 30 wt %, preferably between 2 and 25 wt %.

Said solution or dispersion may further contain, in addition to lauric arginate ethyl ester, one or more further antimicrobial agents and/or odour absorbers.

Preferably, said further antimicrobial agent is selected from cetylpyridinium chloride and dried vinegar. Preferably, cetylpyridinium chloride is present in the solution or dispersion in an amount comprised between 0.2 and 3 wt %, more preferably between 0.3 and 2 wt %, even more preferably of about 0.3 wt %, 1 wt % or 1.6 wt %. Preferably, said odour absorber is zeolite. Preferably, zeolite is present in the solution or dispersion in an amount between 2 and 15 wt %, more preferably between 3 and 10 wt %, more preferably between 3 and 8 wt %, even more preferably of 5 wt %.

A fourth object of the present invention is an article for packaging made from the film of the first object of the invention, optionally containing a product packaged therein.

According to a preferred embodiment, the product is a food product, preferably a fresh food product such as fresh meat, processed meat, poultry, fish, cheese, fruits and vegetables, or a ready prepared food.

When the article of packaging contains a packaged product, at least the surface of the film facing the product is coated, more preferably such coated surface is in intimate contact with the product. The intimate contact with the product increases the antimicrobial effectiveness of the coated film.

According to a preferred embodiment, said article of packaging includes the product and it is a vacuum skin package made with a film according to the present invention. A vacuum skin package includes a support, which may be rigid or semi-rigid, a product loaded on an inner surface of the support and a film according to the present invention draped over the product and welded to the inner surface of the support not occupied by the product to form a skin all around the product.

The support may be thermoplastic or not. Optionally, the inner surface of the support comprises the film according to the present invention. For example, a liner made from the film according to the first object of the invention may be adhered to the internal surface of the support. The liner is preferably laminated on the surface of the support, onto the side facing the packaged product, so that the coated surface of the film is the surface in contact with the product.

Methods for vacuum skin packaging are well known in the art and are described in WO 2016/182831.

According to another preferred embodiment, said article for packaging is a flexible container obtained by self-sealing a coated film according to the first object of the invention or by sealing two films according to the first object of the invention, wherein at least the surface(s) of the film(s) of the invention facing the inside of the container is/are coated. Preferably, the flexible container is in the form of a bag or a pouch. More preferably, when the flexible container comprises the product, it is shrunk around the product.

Any conventional method for making bags and pouches known in the art may be readily adapted to make flexible containers from the multilayer film according to the present invention.

According to an alternative preferred embodiment, said article for packaging is a lidded-package comprising a support, for example a tray, a product placed on the support, and a lid comprising the film according to the first object of the present invention, wherein at least the surface of the film in contact with or facing the product is coated. The lid is hermetically sealed all around onto the support, thus enclosing the product.

This type of package is produced by techniques well known to those skilled in the art. For example, once the product to be packaged has been placed on the support, the coated film according to the first object of the invention is sealed to the support by means of temperature and/or pressure using conventional techniques and equipment. Lidding machines that can be suitable for tray lidding process include for instance Multivac 400 and Multivac T550 by Multivac Sep. GmbH, Mondini Trave, E380, E390 or E590 by Mondini S.p.A., Ross A20 or Ross S45 by Ross-Reiser, Meca-2002 or Meca-2003 by Mecaplastic, the tray lidding machines of Sealpac and the like. Optionally, the film may be also heat shrunk or the sealing may be carried out by applying a modified atmosphere between said lid and said support or under vacuum, depending on the specific needs of the product packaged therein.

The support can be pre-made or thermoformed, preferably in line. According to a preferred embodiment, the support is thermoformed. Preferably, it is a thermoformed support comprising the film of the invention according to the first object of the invention, wherein at least the surface of the film in contact with or facing the product is coated. Preferably, the inner surface of the support comprises the film according to the present invention. For example, a liner made from the film according to the first object of the invention may be adhered to the internal surface of the support. The liner is preferably laminated on the surface of the support, onto the side facing the packaged product, so that the coated surface of the film is the surface in contact with the product.

According to a further alternative preferred embodiment, said article for packaging is a wrapped package comprising a product, optionally placed on a support, and a film according to the first object of the invention wrapped around said product or around both the product and the support, wherein at least the surface of the film in contact with or facing the product is coated.

Preferably, said wrapped package is hermetic. In said hermetic package, the film is sealed to itself. Preferably, the film in said hermetic package is sealed to itself along a longitudinal seal and two transverse seals, to give a pouch.

For instance, a wrapped hermetic package can be obtained by a flowpack packaging method by means of a Horizontal Form-Fill-Seal (HFFS) machine.

In details, such method conventionally comprises:
a) providing the film according to the present invention,
b) running the film through a former thus forming a tube,
c) inserting a product, optionally placed in a container or onto a support, into the tube,
d) sealing the tube longitudinally,
e) sealing and cutting the tube transversally at the beginning and at the end of the package, optionally gas-flushing or vacuumizing the tube before closing it, and
f) optionally, heat shrinking the package.

In a flowpack packaging method, the product, typically placed on a tray, is wrapped into an envelope made from a coated film according to the present invention, preferably under a suitable and predetermined atmosphere. To create the envelope, the flat film is first folded around a former and longitudinally sealed to form a tube. The tray with the product is placed in such a tube where the leading edge has been closed and possibly gas flushed with the suitably selected gas or gas mixture. The excess gas is generally removed by a gentle pressure on top of the package, the open end of the envelope is then sealed and the package separated from the tubing. At least the surface of the film according to the first object of the invention facing the product to be packaged (i.e. the internal surface of the tubing) is coated. In case of a shrinkable film, the loose package is then passed into a shrink tunnel, typically a hot air one set at a temperature suitable for shrinking such as a temperature of 100-150° C., to get shrinkage of the film and thus a tight package.

As an alternative, pouches can be made with Vertical Form Fill Seal (VFFS) packaging systems that have proven to be very useful in packaging a wide variety of flowable products. The VFFS process is known to those skilled in the art, and described for instance in U.S. Pat. No. 4,589,247.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube for soft, fluid or powder products in case of a VFFS machine, and a transverse sealer for sealing the tubular film in a cross-wise direction to separate the products into discrete packages.

Suitable machines for the flowpack process include Ilapak Delta 2000 and 3000 or Ulma Baltic, Artic or Pacific. A fifth object of the present invention is the use of the film according to the first object of the invention for packaging products, preferably food products. In fact, the coated films of the invention are particularly suitable to be used for packaging food, preferably fresh food products such as fresh meat, processed meat, poultry, fish, cheese, fruits and vegetables, or ready prepared foods.

EXAMPLES

The present invention can be further understood by reference to the following examples that are merely illustrative and are not to be interpreted as a limitation to the scope of the claims.

Example 1—Preparation of Films

In the following films, the polymers and compositions indicated in Table 1 below were used.

TABLE 1

| TRADENAME | SUPPLIER | ACRONYM |
|---|---|---|
| 10,075ACP SYLOID CONCENTRATE | Teknor Color | LDPE1 |
| E171B | EVALCA/Kuraray | EVOH1 |
| T60-500-119 | Ineos | HDPE |
| QUEO 2M131 | Borealis | VLDPE1 |
| QUEO 1007 | Borealis | VLDPE2 |
| ADMER NF 538E | Mitsui Chemical | VLDPE-md |
| ELVAX 3165 | DuPont | EVA1 |
| 1003 VN 4 | Total Petrochemicals | EVA2 |
| BYNEL 3101 | DuPont | EVA-md |
| DOWLEX 2045S | DOW | LLDPE1 |
| EXCEED 4518PA | ExxonMobil | LLDPE2 |
| BYNEL 4125 | DuPont | LLDPE-md1 |
| IXAN PV910 | SolVin | PVDC-MA |
| ULTRAMID C33 L | BASF | PA-6\66 |
| Elite 5230GC | DOW | LLDPE3 |
| POLYBATCH FSU 105E | Schulman | LDPE2 |
| ADMER NF518E | Mitsui Chemical | LLDPE-md2 |
| Ultramid B36LN | BASF | PA-6(1) |
| Grivory G21 Natural | EMS-Grivory | PA-6I\6T |
| EV3851V | Chang Chun Petrochemicals Ltd. (CCP) | EVOH2 |
| GRILON MB 3361 FS NATURAL | EMS-Grivory | PA-6(2) |
| 1000048-NA | Ampacet | LDPE3 |

TABLE 1-continued

| TRADENAME | SUPPLIER | ACRONYM |
|---|---|---|
| KAOPOLITE SF | KAOPOLITE, INC. | Additive (AntiBlock) |
| DOWLEX 2037 | DOW | MDPE |
| EF437AA | Westlake Chemical | EVA3 |
| DOWLEX 2045.04 | DOW | LLDPE4 |
| ESCORENE LD318.92 or eXXONMOBIL LD 318.92 | ExxonMobil | EVA4 |

LDPE1: Low-density polyethylene with AntiBlock additives Min 10 Max 15%, Ash 9.2%, Density 0.97 g/cc. Melt Flow Rate (190° C./2.16 kg) 3.00 g/10 min.
EVOH1: Ethylene vinyl-alcohol copolymer with comonomer content 44%. Crystallization point 144° C., Density 1.14 g/cc, Glass Transition 54° C., Melt Flow Rate (190° C./2.16 kg) 1.7 g/10 min, Melting point 165° C., Vicat softening point 152° C.
HDPE: High-density polyethylene. Density 0.9610 g/cc, Melt Flow Rate (190° C./2.16 kg) 6.20 g/10 min, Melting point 135° C.
VLDPE1: Very low-density polyethylene. Density 0.902 g/cc, Melt Flow Rate (190° C./2.16 kg) 7 g/10 min.
VLDPE2: Very low-density polyethylene. Density 0.910 g/cc, Melt Flow Rate (190° C./2.16 kg) 6.6 g/10 min, Melting point 105° C.
VLDPE-md: Anhydride-modified very low-density polyethylene. Density 0.91 g/cc, Melt Flow Rate (190° C./2.16 kg) 4.1 g/10 min, Melting point 121° C., Vicat softening point 85° C.
EVA1: Ethylene Vinyl Acetate copolymer with comonomer content 18.00%. Density 0.940 g/cc, Melt Flow Rate (190° C./2.16 kg) 0.70 g/10 min, Melting point 87.0° C., Vicat softening point 69.0° C.
EVA2: Ethylene Vinyl Acetate copolymer with comonomer content 13.5%. Density 0.935 g/cc, Melt Flow Rate (190° C./2.16 kg) 0.38 g/10 min, Melting point 93° C.
EVA-md: Acid/acrylate-modified ethylene vinyl acetate copolymer with comonomer content 18.40%. Density 0.943 g/cc, Melt Flow Rate (190° C./2.16 kg) 3.20 g/10 min, Melting point 87° C., Vicat softening point 65° C.
LLDPE1: Polyethylene, Linear Low Density ethylene/1-octene copolymer. Density 0.9200 g/cc, Melt Flow Rate (190° C./2.16 kg) 1.00 g/10 min, Melting point 124.0° C., Vicat softening point 103° C.
LLDPE2: Single site catalyzed ethylene/hexene copolymer. Density 0.9180 g/cc, Melt Flow Rate (190° C./2.16 kg ) 4.50 g/10 min, Melting point 114.0° C.
LLDPE-md1: Anhydride-modified linear low-density polyethylene. Density 0.930 g/cc, Melt Flow Rate (190° C./2.16 kg) 2.50 g/10 min, Melting point 126.0° C., Vicat 109° C.
PVDC-MA: Copolymer of vinylidene chloride (VDC) with methyl acrylate (MA). Bulk (Apparent) Density Min 0.78 g/cc, Comonomer content 8.4%, Density 1.71 g/cc, Viscosity Relative Min 1.44 Max 1.48, Viscosity Solution 1.46 mPa · sec.
PA-6\66: Copolymer of polyamide 6 and polyamide 66. Density 1.1200 g/cc, Melting point 196.0° C., Moisture Content 0.08%, Viscosity Min 187 Max 203 mPa · sec.
LLDPE3: Linear low-density polyethylene. Density 0.916 g/cc, Melt Flow Rate (200° C./2.16 kg) 4 g/10 min, Melting point 122° C.
LDPE2: Low-density polyethylene. Density 0.98 g/cc, Melt Flow Rate (190° C./2.16 kg) 20 g/10 min, Moisture Content Max 1.5%.
LLDPE-md2: Anhydride-modified linear low-density polyethylene. Density 0.91 g/cc, Melt Flow Rate (190° C./2.16 kg) 3.1 g/10 min, Melting point 118° C.
PA-6(1): Polyamide 6. Bulk (Apparent) Density 780 g/cc, Density 1.135 g/cc, Melt Flow Rate (275° C./5.00 kg) 24 g/10 min, Melting point 220° C., Viscosity Relative 3.6.
PA-6I\6T: Copolyamide 6I/6T. Density 1.1800 g/cc, Glass Transition 125° C., Melt Flow Rate (275° C./5.00 kg) 25 g/10 min, Moisture Content max 0.1%.
EVOH2: Ethylene Vinyl Alcohol Copolymer with comonomer content (Ethylene) 38%. Crystallization point 151° C., Density 1.19 g/cc, Glass Transition 54° C., Melt Flow Rate (190° C./2.16 kg) 1.80 g/10 min, Melt Flow Rate (210° C./2.16 kg) 3.70 g/10 min, Melting point 173° C.
PA-6(2): Polyamide 6 grade. Ash 7.2%, Density 1.14 g/cc, Melting point 220° C., Moisture Content Max 0.1%, Viscosity Solution 3.45 mPa · sec.
LDPE3: Low-density polyethylene with Additives (Antifog) 15%. Density 0.94 g/cc.
Additive (AntiBlock): Anhydrous aluminum silicate. Density 2.6200 g/cc.
MDPE: Medium density polyethylene with comonomer content 2.50%. Density 0.9350 g/cc, Melt Flow Rate (190° C./2.16 kg) 2.5 g/10 min, Melting point 124.7° C.
EVA3: Ethylene Vinyl Acetate copolymer with comonomer (VinylAcetate) 2.55%. Density 0.925 g/cc, Melt Flow Rate (190° C./02.16 kg) 2.0 g/10 min.
LLDPE4: Linear low-density polyethylene, ethylene/octene copolymer, with comonomer content (Octene) 6.5%. Density 0.9200 g/cc, Melt Flow Rate (200° C./2.16 kg) 1.00 g/10 min, Melt Flow Rate (190° C./2.16 kg).1.0 g/10 min, Melting point 124° C.
EVA4: Ethylene Vinyl Acetate copolymer with comonomer (VinylAcetate) 8.7%. Density 0.930 g/cc, Melt Flow Rate (190° C./02.16 kg).2.0 g/10 min, Melt Flow Rate (190° C./2.16 kg) 2.0 g/10 min, Melting point 99° C., Vicat softening point 81° C.

The above polymers and compositions were used to prepare the following films, having the structure and composition set out in Table 2:

TABLE 2

| Film n. | Layer | Layer composition | | Layer thickness (microns) | Film Total thickness (microns) |
|---|---|---|---|---|---|
| 1 | 1 | 80% | VLDPE1 | 14.8 | 48 |
|   |   | 20% | VLDPE2 |   |   |
|   | 2 | 100% | LLDPE1 | 8 |   |
|   | 3 | 100% | EVA2 | 9 |   |
|   | 4 | 100% | PVDC-MA | 4.8 |   |
|   | 5 | 90% | VLDPE-md | 8.5 |   |
|   |   | 10% | EVA-md |   |   |
|   | 6 | 100% | PA-6\66 | 2.9 |   |
| 2 | 1 | 95% | LDPE2 | 11.9 | 152.5 |
|   |   | 5% | LDPE1 |   |   |
|   | 2 | 100% | EVA1 | 47.7 |   |
|   | 3 | 100% | LLDPE-md1 | 12 |   |
|   | 4 | 100% | EVOH1 | 13.3 |   |
|   | 5 | 100% | LLDPE-md1 | 12 |   |
|   | 6 | 100% | EVA1 | 45.7 |   |
|   | 7 | 5% | LDPE1 | 9.9 |   |
|   |   | 95% | HDPE |   |   |
| 3 | 1 | 98.00% | LLDPE3, | 15.4 | 100.1 |
|   |   | 2.00% | LDPE2 |   |   |
|   | 2 | 100.00% | LLDPE3 | 26.2 |   |
|   | 3 | 100.00% | LLDPE-md2 | 9.2 |   |
|   | 4 | 85.00% | PA-6(1), | 6.2 |   |
|   |   | 15.00% | PA-6I\6T |   |   |
|   | 5 | 100.00% | EVOH2 | 7.7. |   |
|   | 6 | 85.00% | PA-6(1) | 6.2 |   |
|   |   | 15.00% | PA-6I\6T |   |   |
|   | 7 | 100.00% | LLDPE-md2 | 20.0 |   |
|   | 8 | 98.00%, | PA-6(1), | 9.2 |   |
|   |   | 2.00% | PA-6(2) |   |   |
| 4 | 1 | 15% | LDPE3, | 2.6 | 15.6 |
|   |   | 26% | MB1 |   |   |
|   |   | (8% Additive (Antiblock), 92% MDPE), | | | |
|   |   | 25% | EVA3, |   |   |
|   |   | 34% | LLDPE4 |   |   |
|   | 2 | 90% | LLDPE4, | 3.9 |   |
|   |   | 10% | LDPE3 |   |   |
|   | 3 | 100% | EVA4 | 2.6 |   |
|   | 4 | 90% | LLDPE4, | 3.9 |   |
|   |   | 10% | LDPE3 |   |   |
|   | 5 | 15% | LDPE3, | 2.6 |   |
|   |   | 26% | MB1 |   |   |
|   |   | (8% Additive (Antiblock), 92% MDPE), | | | |
|   |   | 25% | EVA3, |   |   |
|   |   | 34% | LLDPE4 |   |   |

Film 1 was extruded through a round die on a double bubble line, quickly quenched and irradiated at 65 KGrays, heated by passing in a water bath at 90° C. at a film speed of 15 m/min, biaxially oriented with stretching ratios of 3.2:1 in longitudinal direction and 3.3:1 in transverse direction and quenched by two air cooling rings kept at 32° C.

Film 2 was manufactured through a coextrusion process in a round cast die, quenched with a water cascade, cross-linked at 200 kGy, and wound into rolls.

Film 3 was extruded through a flat co-extrusion process, quenched with a calendar system (i.e. a series of rolls cooled at approximately 20-40° C.), and wound into rolls.

Film 4 was extruded through a round die on a double bubble line, quickly quenched and irradiated at 90 KGrays, heated by passing into an oven at 110° C. at a film speed of 85 mm/min, biaxially oriented with stretching ratios of 3.4:1 in longitudinal direction and 3.3:1 in transverse direction and quenched by two air cooling rings kept at 32° C.

Example 2—Coating of the Films a) Coating by Offset Gravure

The sealant surface of films 1, 2, 3 and 4 described above was corona treated using a two units corona treater each having power 1.5 KV or 3.6 kW, thus achieving a surface tension (which is a measure of the surface wettability) of approximately 40 dyne/cm.

The coating compositions described in Table 4 below were prepared, containing the components indicated in Table 3 below.

TABLE 3

| Acronym | |
|---|---|
| Component | Acronym |
| Lauryl Arginate Ethyl Ester | LAE |
| Cetylpyridinium chloride | CPC |
| Zeolite 13x | ZEO |
| Ethanol | ETOH |
| Isopropyl alcohol | IPA |
| Ethyl Acetate | ETAC |

Coating compositions 1-12 were prepared having the composition indicated in Table 4.

TABLE 4

| Coating compositions | | |
|---|---|---|
| Coating composition N. | Composition | Appearance |
| 1 | 20% LAE<br>36.8% ETOH<br>16.8% IPA<br>21% ETAC | LAE not dispersed, solid residue |
| 2 | 20% LAE<br>80% ETAC | LAE not dispersed, solid residue |
| 3 | 20% LAE<br>80% IPA | LAE not dispersed, solid residue |
| 4 | 20% LAE<br>80% ETOH | LAE not dispersed, solid residue |
| 5 | 20% LAE,<br>80% water | Whitish, LAE not well dispersed |
| 6 | 10% LAE<br>10% water<br>80% ETOH | Opaque; LAE well dispersed |
| 7 | 10% LAE<br>1.6% CPC<br>10% water<br>78.4% ETOH | Opaque; LAE well dispersed |
| 8 | 20% LAE<br>10% water<br>70% ETAC | Opaque; LAE well dispersed |
| 9 | 20% LAE<br>10% water<br>32.2% ETOH<br>16.8% IPA<br>21% ETAC | Transparent; LAE well dispersed |
| 10 | 10% LAE<br>5% ZEO<br>10% water<br>75% ETOH | Slightly Opaque. LAE and ZEO well dispersed |
| 11 | 2% LAE<br>0.32% CPC<br>10% water<br>87.68% ETOH | Slightly Opaque<br>LAE and CPC well dispersed |
| 12 | 6% LAE<br>5% ZEO<br>0.96% CPC<br>10% water<br>78.04% ETHOH | Slightly Opaque.<br>LAE, ZEO and CPC well dispersed |

Coating compositions 5-12 described in Table 4 showed a sufficiently homogeneous dispersion of LAE, and were used to coat the four films of Table 2 by Offset Gravure, at the operative conditions set out in Table 5 below. In compositions 1 to 4, LAE did not form a stable and uniform dispersion and separated into a solid deposit. These compositions were not used for coating.

Table 5 summarizes the operative conditions used to coat films 1, 2, 3 and 4.

TABLE 5

| Coated films | | | | | |
|---|---|---|---|---|---|
| Coated Film # | Coating composition | Wet content deposed (cc/sqm) | Anilox roll (lines/cm) | Coating speed (m/min) | Drying oven temp. (° C.) |
| Film 1 | | | | | |
| 5 | 5 | 2-3 | 320 | 90 | 80 |
| 6 | 5 | 4-5 | 100 | 90 | 90 |
| 7 | 6 | 6 | 80 | 90 | 90 |
| 8 | 7 | 6 | 80 | 90 | 90 |
| 9 | 8 | 5.5 | 70 | 80 | 80 |
| 10 | 9 | 4-5 | 100 | 90 | 90 |
| 11 | 10 | 7-8 | 60 | 80 | 80 |
| 12 | 11 | 7-8 | 60 | 80 | 80 |
| 13 | 12 | 7-8 | 60 | 80 | 80 |
| Film 2 | | | | | |
| 14 | 5 | 4-5 | 100 | 90 | 90 |
| 15 | 9 | 4-5 | 100 | 90 | 90 |
| 16 | 10 | 7-8 | 60 | 80 | 80 |
| Film 3 | | | | | |
| 17 | 5 | 4-5 | 100 | 90 | 90 |
| 18 | 9 | 4-5 | 100 | 90 | 90 |
| Film 4 | | | | | |
| 19 | 9 | 4-5 | 100 | 90 | 90 | b) Coating by Vapour Deposition

Coated film 20 was obtained by coating film 1 by Vapour phase technology.

In details, film 1 was plasma treated at 3 kVolt. A powder containing 100% lauric arginate ethyl ester was melted at 95° C. and then evaporated by heating at 280° C. The evaporated lauric arginate ethyl ester was then sprayed onto one surface of the film laid onto a chill roll kept at −10° C.

Example 3—Analysis of Coated Films

Coated films 1-20 obtained as described above were analyzed for LAE amount deposed, stickiness and coating uniformity. Stickiness and coating uniformity were determined visually. The quantitative determination of LAE was performed on a limited number of samples, indicated below. In details, this was determined by washing ¼ of sq dm of coated film in a mixture of water-methanol in a ratio of 90:10 and the extracted medium was analyzed through High Resolution HPLC Mass Spectrometry (Agilent 6550 i-Funnel Q-TOF LC/MS).

The theoretical dry content deposed based on the wet content used for coating was also calculated and it is reported below.

The data obtained are summarized in the following Table 6.

TABLE 6

| Analysis of films | | | | |
|---|---|---|---|---|
| Film # | Theoretical Dry content deposed (g/sqm) | LAE amount (g/sqm) | Stickiness | Coating uniformity |
| 5 | 0.4-0.5 | 0.120 | Sticking effect | Non-uniform |
| 6 | 0.8-1 | 0.650 | Sticking effect | Non-uniform |
| 7 | 0.6 | NA | Slight sticking effect | Uniform |
| 8 | 0.6 | NA | Slight sticking effect | Uniform |
| 9 | 0.9 | NA | Slight sticking effect | Uniform |

TABLE 6-continued

Analysis of films

| Film # | Theoretical Dry content deposed (g/sqm) | LAE amount (g/sqm) | Stickiness | Coating uniformity |
|---|---|---|---|---|
| 10 | 0.8-1 | 0.781 | No sticking effect | Uniform |
| 11 | 0.6 | NA | No sticking effect | Uniform |
| 12 | 0.6 | NA | No sticking effect | Uniform |
| 13 | 0.6 | NA | No sticking effect | Uniform |
| 14 | 0.8-1 | 0.55 | Sticking effect | Non-uniform |
| 15 | 0.8-1 | NA | No sticking effect | Uniform |
| 16 | 0.6 | NA | No sticking effect | Uniform |
| 17 | 0.8-1 | NA | Sticking effect | Non-uniform |
| 18 | 0.8-1 | NA | No sticking effect | Uniform |
| 19 | 0.8-1 | NA | No sticking effect | Uniform |
| 20 | 0.6 | 0.650 | No sticking effect | Uniform |

The above reported data demonstrate that coating compositions only containing water (used to prepare coated films 5, 6, 14 and 17) show a non-uniform coating and/or amount of LAE deposed significantly lower than the theoretical value. On the contrary, a uniform coating is obtainable with coating compositions containing 10% of water and at least 70% of a solvent selected from Ethanol, Isopropanol or Ethyl Acetate and mixtures thereof. Furthermore, in film 10, the LAE amount measured substantially corresponds to the theoretical value. Furthermore, the use of a mixture of water and the above three solvents allows to obtain a coating which does not show any sticking effect.

Example 4—In Vitro Antimicrobial Activity of Coated Films

In vitro tests were conducted, according to standard method ISO22196 "Measurement of antibacterial activity on plastics and other non-porous surfaces", to evaluate the antimicrobial activity of coated films 7, 11, 12, 13 and 20 in comparison with uncoated film 1.

The results of the tests are reported in tables 7 and 8 below as R values, where R indicates the antimicrobial activity and it is calculated from the following formula:

$R = Ut - At$, wherein:

Ut is the average of the logarithm of the number of viable bacteria, in cells/cm², recovered from the uncoated film 1 after 24 h;

At is the average of the logarithm of the number of viable bacteria, in cells/cm², recovered from the coated film specimens after 24 h.

A film is considered as endowed with antimicrobial activity if the value of R is above 2.

The antimicrobial activity of coated films 7, 11, 12, 13 and 20 (at 2 months after coating), in comparison with uncoated film 1 was first evaluated and the results obtained are reported in table 7 below.

TABLE 7

| | Antibacterial activity | |
|---|---|---|
| | R | |
| Film | Escherichia Coli strain ATCC ® 10536 ™ from ATCC | Staphylococcus aureus strain ATCC ® 10536 ™ from ATCC |
| 7 | 2.6 | NA |
| 11 | 2.5 | 3.3 |
| 12 | 3.1 | 3.3 |
| 13 | 2.9 | 2.8 |
| 20 | 3.6 | 3.8 |

The results show that LAE coated films exert a potent antimicrobial activity towards the two microorganisms tested.

Film 7 shows an effective antimicrobial activity towards Escherichia Coli. All the other coated films, which have been tested for activity towards both Escherichia Coli and Staphylococcus aureus show a consistent log reduction between 2.5 and 3.8 log for both microorganisms.

In order to confirm the antimicrobial activity of a film coated with LAE and to check if the antimicrobial activity of the coated films is maintained over time, the test has been conducted on coated film 10, both at time 0 from coating and at 9 months from coating. Antimicrobial activity has been evaluated only against Staphylococcus aureus.

The film tested at 9 months was stored at an average temperature of 23° C. (maximum 32° C.) and at 80% RH. The results obtained are reported in table 8 below.

TABLE 8

| | Antimicrobial activity | |
|---|---|---|
| | R | |
| Film | Escherichia Coli strain ATCC ® 10536 ™ from ATCC | Staphylococcus aureus strain ATCC ® 10536 ™ from ATCC |
| Film 10 at time 0 | 3.4 | 5.9 |
| Film 10 at 9 months from coating | 5.9 | 6.6 |

As can be seen from the results above, the antimicrobial activity of the film is stable and it is maintained upon storage of the film.

Example 5—Shelf Life Tests on Poultry Breast 200 gr of poultry breast were vacuum packaged in each of coated films 7, 11, 12 and 13 with the coated surface towards the product and in uncoated film 1 through a packaging machine including Flowvac and Rotary.

The films were stored at +2-+4° C. in the dark. At packaging (DOP) and 3 (DOP+3), 7 (DOP+7), 10 (DOP+10), 14 (DOP+14) and 20 (DOP+20) days after packaging microbial and organoleptic analyses of the films and of the packaged products were carried out as described below.

Microbial Analysis:

Total microbial count (Total Viable Count, Pseudomonas and Enterobacteriacee) was measured on all samples at the different times indicated above. The microbial contamination was considered acceptable at a value below 6 log. The results obtained are reported in Table 9 below.

TABLE 9

Microbial contamination

Total microbial count (log cfu/g)

| Film | DOP | DOP + 3 | DOP + 7 | DOP + 10 | DOP + 14 |
|---|---|---|---|---|---|
| 1 | 5.42 | 5.75 | 6 | 6.8 | 7.3 |
| 7 | 5.42 | 5 | 5 | 5.5 | 7 |
| 11 | 5.42 | 4.9 | 5 | 6.3 | 6.8 |
| 12 | 5.42 | 4.8 | 5 | 6.8 | 6.7 |
| 13 | 5.42 | 4.1 | 5.6 | 5.9 | 7 |

As can be seen from the results reported above, up to DOP+7 all samples had acceptable microbial count. This timepoint is the maximum shelf life for the product packaged in the uncoated film 1, which shows the maximum acceptable microbial contamination of 6 log. On the contrary, all the coated films show a value of microbial count at DOP+7 far below this limit which allows to prolong the shelf life of the packaged product beyond 7 days after packaging and up to 10 days after packaging. In particular, films 7 and 13 were able to maintain a microbial load at acceptable levels at DOP+10. At DOP+14, all the products packaged had a microbial load above the acceptable limit.

Organoleptic Analysis

Color evaluation of the poultry breast samples was carried out by a group of 5 expert panelists: no differences were revealed between the different samples, this is in line with the fact that poultry meat has reduced amount of pigment, therefore presents a high color stability.

Odor evaluation was also conducted on the packaged products by a group of 5 expert panelists. Scores from 1 to 3 were attributed to the poultry breast samples packaged in each film and analysed at the above indicated times. A score of 1 indicates fresh meat odor, a score of 3 indicates not acceptable spoiled sour or sulphur odor. The mean value between the scores obtained for each packaged product is reported in Table 10 below.

TABLE 10

Organoleptic scores

Odor/colour scores

| Film | DOP | DOP + 3 | DOP + 7 | DOP + 10 | DOP + 14 | DOP + 20 |
|---|---|---|---|---|---|---|
| 1 | 1 | 2 | 1 | 2.8 | 2.5 | 3 |
| 7 | 1 | 1.1 | 1 | 2.5 | 2.8 | 2.5 |
| 11 | 1 | 1 | 1.1 | 1 | 1.5 | 2.7 |
| 12 | 1 | 1.1 | 1 | 2 | 2.5 | 2.5 |
| 13 | 1 | 1.7 | 1.1 | 1.1 | 1.8 | 2.8 |

As can be seen from the results above, films 11 and 13 show the best performance up to DOP+14, notwithstanding at this stage microbial load is just above the limit of acceptability. This shows that the presence of zeolite in the coating is able to improve the organoleptic properties of the packaged products.

At DOP+20 all samples are clearly spoiled with the characteristic spoilage odor.

In view of the results of above analyses, it is clear that the coated films increase the shelf life of poultry at least from 7 to 10 days after packaging.

Example 6—Food Safety Test

An in vitro test was conducted to evaluate the antimicrobial activity against contamination bacteria of coated films 7 and 12 in comparison with uncoated film 1.

50 ml of a culture of non-pathogenic *E. Coli* strain ATTC 10536 at a concentration of 1.10 E+0.6 cfu/ml was added onto 50 g of poultry breast placed in a sterile container.

After 5 minutes of incubation, the poultry breast was drained and vacuum packaged into reference film 1 (uncoated), film 7 or film 12. The coated films 7 and 12 were used with their coated surface towards the packaged product.

The packaged products were stored in a refrigerator and microbiological analysis was performed at packaging (DOP) and at day 1 (DOP+1), day 3 (DOP+3) or day 7 (DOP+7) after packaging.

In details, the analysis at each timepoint was performed by adding 250 ml of a trypton buffer to 25 g of poultry under biosafety cabinet using sterile equipment and shaking in a Stomacher shaker for 30 seconds at 260 RPM. The solution obtained and 5 dilutions 1/10 thereof (1 ml each) were then added to Petri dishes and incubated at the growing conditions suitable for *E. Coli* ATTC 10536 at 37° C. for 24 hours. In details, the following growing medium was used:
  peptone from casein 15.0 g/L
  peptone from soymeal 5.0 g/L
  sodium chloride 5.0 g/L
  agar-agar 15.0 g/L.

Two subcultures were performed in order to get optimum exponential phase of growth and suspension calibration was carried out with UV spectroscopy at 620 nm to obtain the cfu/ml value.

In table 11 below, the antimicrobial activity, expressed as R (log reduction as defined in Example 4), at different timepoints is reported for each film tested.

TABLE 11

Antimicrobial activity

R

| Film | DOP | DOP + 1 | DOP + 3 | DOP + 7 |
|---|---|---|---|---|
| 7 | 0.8 | 0.9 | 0.7 | 0.9 |
| 12 | 0.5 | 0.6 | 0.4 | 0.8 |

The results obtained demonstrate that, although the log reduction obtained is below 2, the coated films still allow a decreasing of the microbial load compared to the uncoated film. Therefore, also in the context of packaging of contaminated food, the coated films of the invention may constitute an additional barrier to the spread of pathogen microorganisms. However, in case of pathogens contaminated food, the coated films should be combined with other treatments that decrease the contamination at different processing steps.

Example 7—Shelf Life Tests on Pork Loin 500 gr of pork loin were vacuum packaged with shrink in each of coated films 7, 11, 12 and 13 and in uncoated film 1 using a packaging machine including Flowvac and Rotary. The coated films were used with the coated surface towards the packaged product.

The films were stored at +2-+4° C. in the dark. At packaging (DOP) and at day 3 (DOP+3), day 7 (DOP+7), day 10 (DOP+10), day 14 (DOP+14) and day 20 (DOP+20) after packaging microbial analysis of the films was carried out as described below.

Microbial Analysis:

Total microbial count (Total Viable Count, *Pseudomonas* and *Enterobacteriacee*) was measured on all samples at the different timepoints indicated above. The results obtained are reported in Table 12 below.

TABLE 12

Microbial contamination

Total microbial count (log cfu/g)

| Film | DOP | DOP + 1 | DOP + 4 | DOP + 12 | DOP + 19 | DOP + 25 | DOP + 29 |
|---|---|---|---|---|---|---|---|
| 1 | 4.69 | 3 | 5 | 6.6 | 5.7 | 6.4 | 6.9 |
| 7 | 4.69 | 3 | 5 | 5.9 | 5.3 | 5.8 | 6.4 |
| 11 | 4.69 | 3 | 5.3 | 5.1 | 5.3 | 4.8 | 6.1 |
| 12 | 4.69 | 3.4 | 5.3 | 5 | 5.05 | 6 | 6.4 |
| 13 | 4.69 | 3 | 5 | 5.1 | 4.6 | 6.1 | 6 |

As can be seen from the results reported above, all the coated films have been able to reduce the total microbial load in respect to the uncoated film. Particularly, the best performing films are films 11 and 13, which are able to maintain the total count at acceptable levels (approximately 6 log) until the end of the shelf life.

Sensorial evaluation has been performed in a subjective manner with a restricted group of panelists. Films 11, 12 and 13 were evaluated at the end of the shelf life (due to reduced number of samples) and showed the best performance in terms of odor. This is in line with the coating formulation, which includes zeolite.

Example 8

In order to evaluate the effect of shrinkage on antimicrobial activity of the coated films, 3 samples of pork loin cuts (300 g each) were packed into film 7 under vacuum and the package was shrunk into a conventional water tank at 80° C. for 4 sec (samples 1-3). 3 samples of the same product were packed into film 7 under vacuum but the package was not shrunk (samples 4-6).

A shelf life test was carried out as described in Example 5 for 21 days and microbial count for *Pseudomonas* and Total Microbial Count was measured on all samples after 21 days for the two types of packaging solutions.

Uncoated film 1 was used as reference material (Reference).

The results are summarized in the following Table 13.

TABLE 13

Microbial contamination

Microbial count (log cfu/g)

| Sample# | Pseudomonas | Total Microbial Count |
|---|---|---|
| Reference | 6.81 | 8.14 |
| 1 (shrunk) | 4.87 | 5.6 |
| 2 (shrunk) | 4.04 | 6 |
| 3 (shrunk) | 5.01 | 6.04 |
| 4 (non-shrunk) | 6.02 | 8 |
| 5 (non-shrunk) | 6.5 | 8.58 |
| 6 (non-shrunk) | 6.49 | 8.45 |

As can be seen from the results above, the shrunk packs are able to maintain a low microbial load compared to the reference material even after 21 days from packaging. The samples packaged with the unshrunk coated material does not show an acceptable microbial load at this time point.

According to these results, coated films that have undergone shrink are more efficient in reducing the microbial load. Without wishing to be bound by any specific theory, it is believed that the heat of the shrink treatment may booster the antimicrobial properties of LAE.

The invention claimed is:

1. Thermoplastic packaging film having at least one surface coated with a coating containing lauric arginate ethyl ester, wherein said coating does not contain any polymer.

2. The thermoplastic packaging film according to claim 1, wherein said coating comprises at least 40 wt % of lauric arginate ethyl ester.

3. The thermoplastic packaging film according to claim 1, wherein said lauric arginate ethyl ester is present on the coated surface of the film in an amount of at least 0.2 g/sqm.

4. The thermoplastic packaging film according to claim 1, wherein said coating further contains at least one further antimicrobial agent, selected from cetylpyridinium chloride and dried vinegar and/or an odour absorber.

5. The thermoplastic packaging film according to claim 4, wherein said further antimicrobial agent is cetylpyridinium chloride, contained in an amount comprised between 3 and 18 wt %.

6. The thermoplastic packaging film according to claim 4, wherein said odour absorber is zeolite, contained in an amount between 10 and 50 wt %.

7. The thermoplastic packaging film according to claim 1, wherein one surface of the film is coated with said coating.

8. The thermoplastic packaging film according to claim 1, wherein both surfaces of the film are coated with said coating.

9. The thermoplastic packaging film according to claim 1, wherein the film is a heat sealable film, and a surface of the sealant layer of the film is coated with said coating.

10. The thermoplastic packaging film according to claim 1, wherein the film is mono or biaxially oriented.

11. The thermoplastic packaging film according to claim 1, wherein the film is heat-shrinkable and has a percentage of free shrink at 90° C. of at least 10% in longitudinal and/or in transverse direction, measured according to ASTM D2732.

12. Method for the preparation of a thermoplastic packaging film having at least one surface, wherein a coating composition containing lauric arginate ethyl ester is applied to at least one surface of the film, wherein said coating composition does not contain any polymer.

13. The method according to claim 12, further comprising, prior to the application of the coating composition, a step of corona treating or plasma treating the at least one surface of the film to be coated.

14. The method according to claim 12, wherein the coating composition is a solution or a dispersion of lauric arginate ethyl ester in a liquid vehicle comprising between 5 and 30 wt % of water and one or more water miscible organic solvents with a weight ratio between water and the organic solvents between 1:7 and 1:9, and the application of the coating composition is followed by the removal of the liquid vehicle.

15. The method as claimed in claim 14, wherein said solution or dispersion contains an amount of lauric arginate ethyl ester between 1 and 30 wt % and optionally contains one or more further antimicrobial agents, including cetylpyridinium chloride and/or an odour absorber.

16. The method as claimed in claim 14, wherein said one or more water miscible organic solvents are selected from $C_1$-$C_4$ alcohols and $C_1$-$C_4$ esters and mixtures thereof.

17. The method according to claim 12, wherein the coating composition is a powder comprising at least 90 wt % lauric arginate ethyl ester and application of the coating is carried out by Vapour Deposition.

18. A solution or a dispersion of lauric arginate ethyl ester in a liquid vehicle containing a mixture of water, ethanol, isopropyl alcohol and ethyl acetate, between 5 and 30 wt % of water and between 30 and 40 wt % of ethanol, between 12 and 20 wt % of isopropyl alcohol and between 15 and 25 wt % of ethyl acetate, wherein said solution does not contain any polymer.

19. An article for packaging made from a thermoplastic film having at least one surface coated with a coating containing lauric arginate ethyl ester, wherein said coating does not contain any polymer, optionally comprising a product packaged therein.

20. The article for packaging according to claim 19, which is a flexible container obtained by self-sealing a coated thermoplastic film or by sealing two thermoplastic films, wherein at least one surface of the two thermoplastic films facing an inside of the container is/are coated and optionally the container is shrunk around the product.

\* \* \* \* \*